Jan. 3, 1939. B. F. BIRD 2,142,091
PROCESS OF HYDRATING VEGETABLE MATTER
Filed April 6, 1936 2 Sheets-Sheet 1
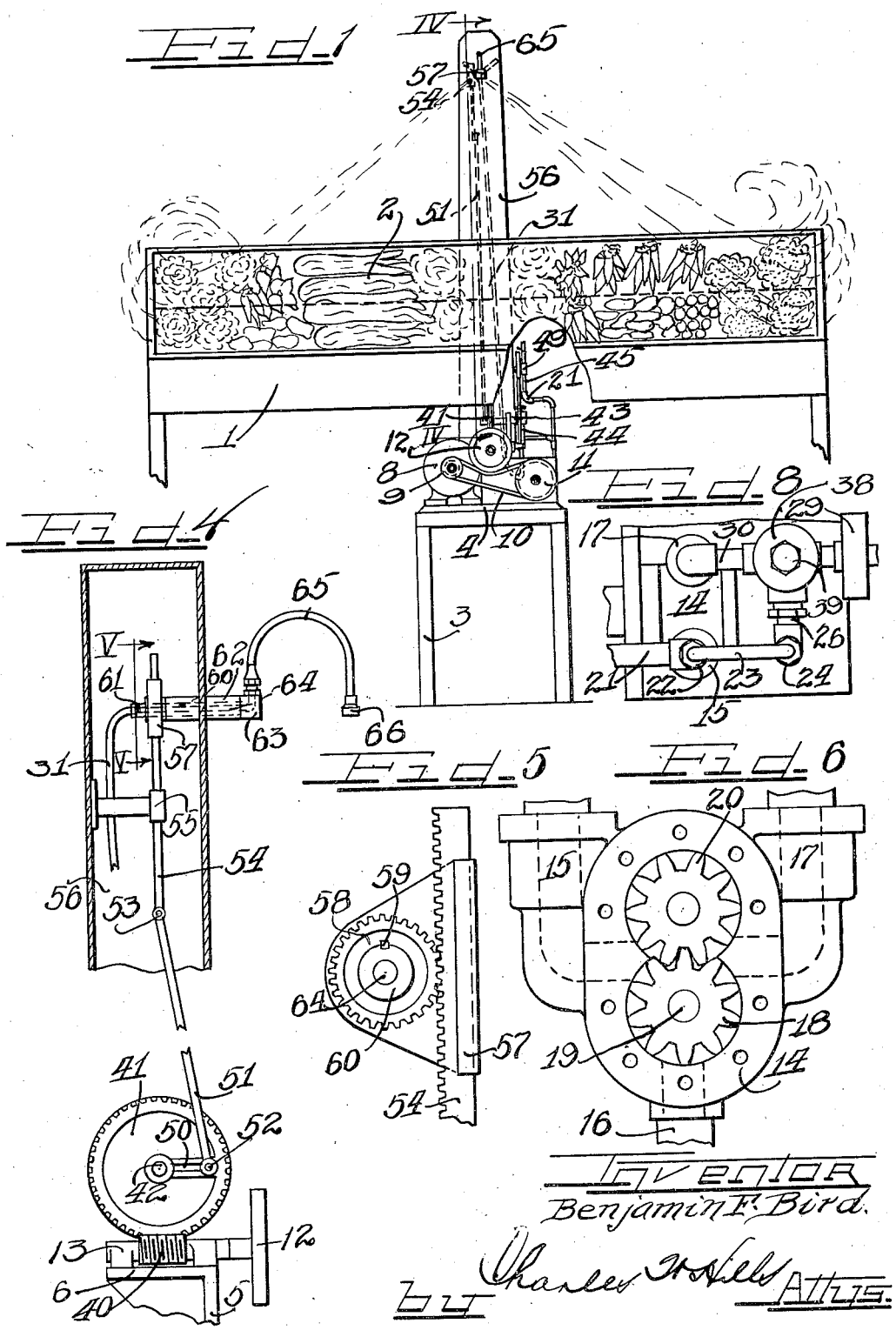
Inventor
Benjamin F. Bird

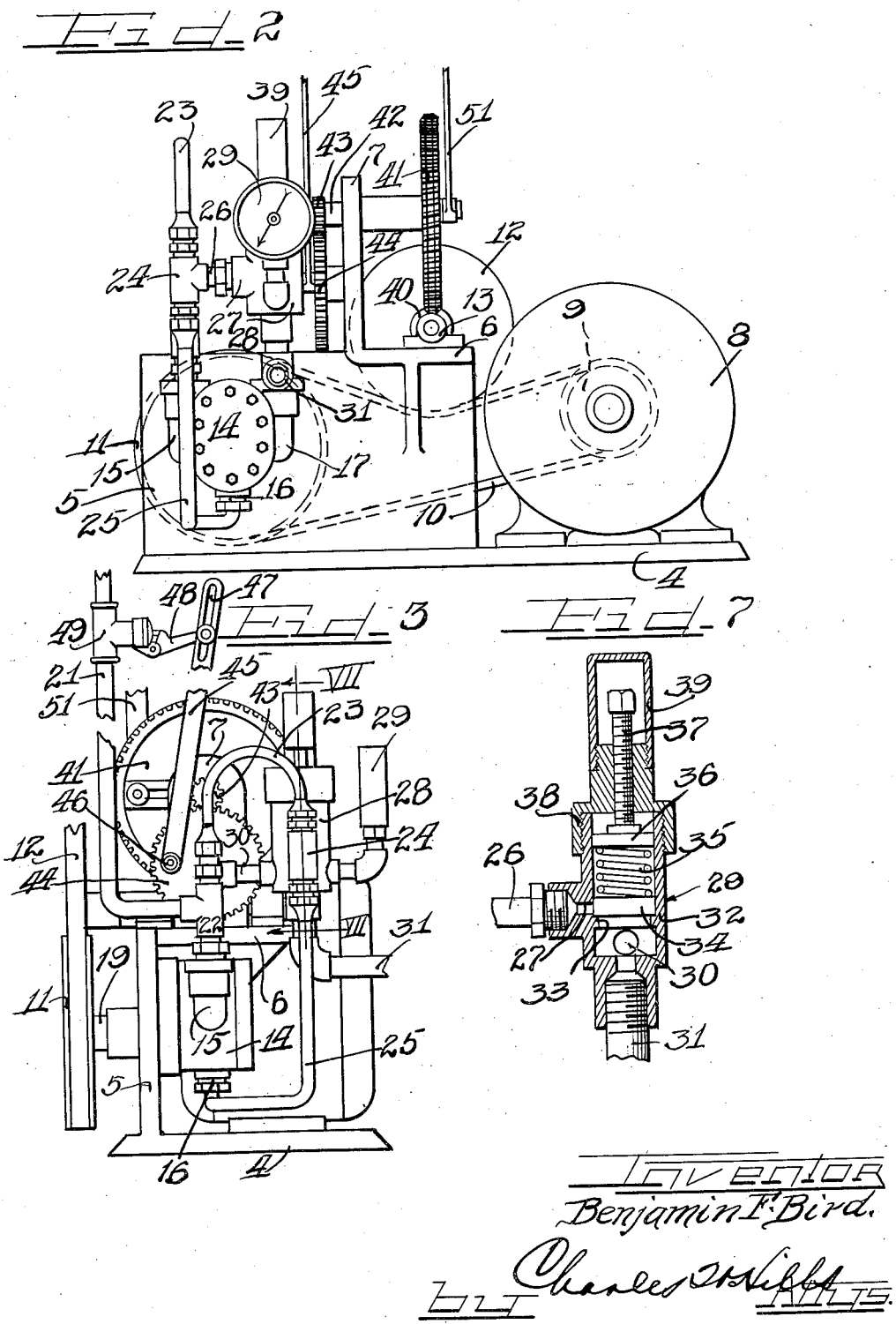

Patented Jan. 3, 1939

2,142,091

UNITED STATES PATENT OFFICE 2,142,091

PROCESS OF HYDRATING VEGETABLE MATTER

Benjamin F. Bird, Kenilworth, Ill.

Application April 6, 1936, Serial No. 72,863

1 Claim. (Cl. 99—154)

This invention relates to a method of hydrating for enabling the preservation of vegetable matter and other plant life.

The present subject matter has been continued-in-part from my Patent No. 2,039,769, dated May 5, 1936, which patent is in turn a continuation in part of my Patent No. 2,039,768, dated May 5, 1936. It is to be understood that my present invention may be broadly practiced by either of the apparatus disclosed in my aforesaid patents.

In order to illustrate how my novel process may be carried out, I have chosen for the purpose of illustration herein the apparatus disclosed in my Patent No. 2,039,769.

An object of this invention is to provide a novel process of hydrating vegetable or other plant matter in such a manner that a mass of such matter can be progressively subjected to a water or vaporous mist of such amount and character as to enable preservation of the vegetable matter, but not great enough to result in flooding of the vegetable matter with a deleterious amount of water.

In accordance with the process of my invention, the mass to be treated is subjected to an alternating spray of water mist which is intermittently operated so as to preclude saturation of the vegetable matter with an amount of water greater than is required properly to preserve such matter. In other words, the vegetable matter is sprayed with a water fog progressively from one end of the vegetable mass to the other, which fog is periodically discontinued so as to cause to be delivered to the vegetable mass amounts of water consistent with the ability of such mass to accommodate the same.

It is believed that my novel process will be best understood from a description of the apparatus by which the process may be practiced.

Other objects, features and advantages of my invention will more fully appear from the following detailed description of the apparatus for practicing the process, taken in connection with the accompanying drawings, which illustrate a single embodiment of the apparatus, and in which:

Figure 1 is a view in elevation, with parts broken away, illustrating apparatus involved and the use of the present invention;

Figure 2 is an enlarged fragmentary view with the main operating mechanism as shown in Figure 1, but seen from the opposite side.

Figure 3 is a fragmentary side elevational view of the structure shown in Figure 2, taken from the left-hand side thereof;

Figure 4 is a fragmentary sectional view with parts broken away taken substantially as indicated by the line IV—IV of Figure 1;

Figure 5 is an enlarged fragmentary sectional view of a portion of the apparatus taken substantially as indicated by the line V—V of Figure 4;

Figure 6 is an enlarged fragmentary front elevational view of the pump mechanism shown with the cover thereof removed;

Figure 7 is an enlarged fragmentary vertical sectional view through the pressure by-pass valve, taken substantially as indicated by the line VII—VII of Figure 3; and Figure 8 is a diagrammatic plan view of a portion of the piping mechanism associated with the pump, indicating the layout of the pipes.

As shown on the drawings:

The present invention is illustrated with a hydrating apparatus functioning in connection with a display stand 1 containing a plurality of various vegetables 2, although it will be understood that the invention may be used with other and various articles to be hydrated and in other and various positions.

Preferably, beneath the stand 1, any suitable type of foundation 3 is provided and upon which the base 4 of the operating mechanism rests. All of the operating mechanism is preferably assembled in unitary style upon the single base 4 which carries integral therewith an upright frame portion 5 of suitable shape. The frame 5 includes a horizontally extending shelf 6 and a second upright portion 7 is integral with the shelf 6 and functions as a bearing for certain shafts to be later described herein.

Although an electric motor 8, mounted upon the base 4 and obtaining energy from any suitable source of power not shown in the drawings, is illustrated as the driving means for the present invention, it will readily be understood that any other suitable form of driving means might equally as well be employed. The shaft of the motor is provided with a driving pulley 9 engaged by a suitable belt 10 which passes over a pulley 11 journaled in the upright 5 of the frame. The belt not only drives the pulley 11 but also drives a rider pulley 12 suitably mounted in a journal 13 (Figure 2) on the shelf 6 of the frame. Obviously, the rider pulley 12 turns in a reverse direction to that of the pulleys 9 and 11.

Mounted in any suitable manner on the opposite side of the vertical wall 5 of the frame (Figures 2 and 3) is a pump 14. In this instance, the pump is shown as a gear pump, although it might be equally as feasible to use some other type. The pump 14, as best seen in Figure 6, preferably comprises a casing having an inlet 15 formed on one side thereof, another inlet 16 formed in the bottom thereof, and an outlet 17 disposed oppositely to the inlet 15. Within the pump body the lower gear 18 is mounted upon and driven by a shaft 19 which is also the shaft of the pulley 11 (Figure 3). An upper gear 20 is also included within the pump casing on a suitable shaft and is arranged to be driven by the lower gear, but obviously in the opposite direction. The inlet 15 and the outlet 17 preferably communicate evenly or in the same plane with the meshed teeth of the gears 18 and 20, whereby fluid entering the inlet 15 cannot pass straight through to the outlet 17 but must be carried around through substantially a revolution of the gears within the spaces between the gear teeth in a manner well known in connection with the use of gear pumps.

A water supply line 21 connected to any suitable source of water supply not shown in the drawings, leads by way of a T 22 and the customary fitting to the inlet 15 of the pump 14 (Figure 3). The other leg of the T 22 is connected through a by-pass 23 to the upper leg of a T 24 which functions as a by-pass casing and has the lower vertical leg thereof connected through a pipe line 25 to the intake 16 at the bottom of the pump casing. The horizontal leg of the T 24 is connected by means of a suitable nipple 26 (Figure 2) and the customary connections to a port 27 opening from the side of a pressure by-pass valve mechanism generally indicated by numeral 28. This pressure valve mechanism is provided with a suitable pressure gauge 29 for a well known purpose. The outlet 17 is also connected through a suitable pipe 30 to the pressure valve mechanism, preferably at a point below the pipe 26 (Figures 3 and 7). Leading from a port in the bottom of the pressure valve casing is a pipe line 31, the upper portion of which is flexible, and which communicates, as indicated in Figures 1 and 4, with the spraying device which will be later described.

The pressure by-pass valve mechanism itself, as seen in Figure 7, comprises a body portion 32 provided with an inner annular shoulder 33 above the aforesaid inlet pipe 30 from the pump discharge 17. Immediately above and normally resting upon the shoulder 33 is a piston 34, which, when in its normal position, effectively blocks the aforesaid outlet 27 leading through the line 26 to the by-pass T 24. The piston 34 is held in normal position by means of a spring 35 bearing thereagainst, and also bearing at the opposite end against the head plate 36. The force exerted by this spring may be varied in accordance with the exigencies of circumstances by means of a screw 37 threadedly engaged in a cap 38 upon the body portion 32. A protecting closure 39 is threadedly engaged with the cap 38 over the head of the adjusting screw 37.

From the foregoing description of the pressure valve mechanism, it is apparent that when water is introduced into the casing 32 from the pump discharge through the inlet 30, the water will pass into the pipe line 31 through the relatively restricted opening thereto and eventually reach the nozzle of the spraying apparatus. However, when the pressure within the casing 32 builds up to a predetermined value, the piston 34 will be elevated against the action of the spring 35 and open up the by-pass port 27, whereupon a proportionate quantity of the water will be by-passed through the line 26 into the by-pass T 24 and thence through both lines 23 and 25 into the pump through the intake ports 15 and 16 respectively.

An important feature of the present invention becomes apparent at this point, namely, that the water entering the pump through the lines 23 and 25 is obviously under pressure previously developed by the pump.

Consequently, this water entering through the intake ports 15 and 16 will exert pressure upon the teeth of the gears 18 and 20 and enhance the rotation of these gears, thereby lessening the work and the power consumption of the driving motor 8. It has been found by actual test that the power consumption of the motor is materially less with this form of by-passing, than is the case with a form where the bypassed water is not led back into the pump. Obviously, if some other form of driving means rather than the electric motor 8 were utilized, the operation of such driving means would be rendered more economical with the above-described by-pass arrangement.

It is desirable, when hydrating articles of the character of fresh vegetables, to provide the mist of water only at predetermined intervals, since too much water is almost as bad as not enough. Means are therefore provided in the present invention for intermittently cutting off the water supply. The means employed herein, however, act directly upon the water supply and do not require a cessation of operation of the driving means, as is the case in my copending application Serial No. 676,498. The water control means are driven or actuated through suitable interconnecting mechanism from the motor 8.

The aforesaid rider pulley wheel 12 with its shaft journaled as at 13 on the shelf 6 carries upon its shaft a worm wheel 40 (Figures 2 and 4). This worm wheel meshes with a suitable gear 41 carried on a shaft 42 journaled in the upright 7 of the frame. On the opposite side of the upright the shaft 42 also supports a pinion 43 which in turn meshes with a spur gear 44 also carried by a suitable shaft journaled in the same upright 7 at a point lower down (Figures 2 and 3). At an eccentric or offset point on the gear 44, a pitman 45 is connected at one of its ends as indicated at 46, and the other end of this pitman is provided with a lost motion slot 47 within which the outer end of a valve actuating arm 48 is pivotally and slidably connected. This valve arm 48 controls a valve 49 which may be of any suitable standard character and is disposed in the water supply line 21. It will therefore be seen that the worm wheel 40, the gear 41, the pinion 43 and the spur gear 44 effect a reduction gearing driven by means of the motor 8, whereby the pitman 45 will be actuated at a much slower speed than is the armature of the motor. As the construction is seen in Figure 3, the valve 49 is closed and the water supply cut off, but as the gear 46 turns and the pitman rises, the valve arm 48 will be pivoted upwardly and inwardly, opening the valve for a suitable period of time, after which, through the continuous movement of the gear 46, the pitman will close the valve again at a more advanced point in its cycle.

From the foregoing, it will be seen that while the motor may run continuously, and therefore much more quietly and with no interference with other electrical apparatus in the same building, and while the pump also runs continuously, the water supply is intermittently cut off, and by proper adjustment of the valve 49 and an obvious arrangement of the pitman 45, the intervals of time relative to the water flow may easily be predetermined.

For the adequate hydrating of vegetables or whatever else it may be desired to hydrate, it is found expedient to employ an oscillating spray.

To this end, the gear 41 driven from the worm 40 is provided with a radial slot 50 (Figure 4) and the lower end of a pitman 51 is pivotally and slidably connected in the slot 50 as indicated at 75

52. The upper end of the pitman is pivotally connected at 53 to a vertically reciprocatory rack 54 slidable in a suitable bearing 55 secured in any desired manner to a vertically extending housing 56. The rack is kept in place by a guide element 57 also suitably mounted within the housing 56. The rack meshes with a hubbed spur gear 58 keyed as at 59 (Figure 5) to a rock shaft 60 in the form of a hollow pipe to the inner end of which the flexible water feeding line 31 is connected as at 61 by any suitable fitting. The rock shaft 60 is contained within a suitable bearing housing 62 mounted in any desired manner on the housing 56, and beyond the housing 62 the rock shaft is provided with a head 63 of substantially the same size as the housing. The head 63 may be integral with the rock shaft or securely affixed thereto and is rotatable therewith. As seen clearly in Figure 4, the head 63 is provided with a right angular opening therein, 64, in alignment with the passage through the rock shaft. Secured to this head also in alignment with the other leg of the opening 64 is a spray pipe 65 terminating in a nozzle 66 which is of a type designed to expel a fine spray or vaporous mist of water or other fluid passing therethrough, a nozzle of the type used in atomizing oil burners being highly satisfactory. Of course, the spray pipe 65, together with the nozzle, oscillates back and forth with the rock shaft, as indicated by the dotted lines in Figure 1, so all of the vegetables contained in the tray 1 will be equally hydrated.

It is obvious from the foregoing description that as the gear wheel 41 rotates, the rack bar 54 is caused to reciprocate by means of the pitman 51 and oscillates or rocks the shaft 60 together with the spray backwards and forwards. The pipe 65 is preferably flexible and can be bent to adapt the spray for various widths of stands 1.

The operation of the present invention is extremely simple and economical. Water enters through the supply line 21 going directly into the pump through the intake 15. In the pump, pressure is developed and water under higher pressure is discharged through the exit 17 into the pressure by-pass valve through the intake 30. Water flows out of this valve through the restricted outlet into the line 31 and from there is ejected through the nozzle 66 over the substance to be hydrated. At the same time, the nozzle is caused to oscillate by means of the pitman 51 connected to the gear 41 and the rack and gear connection 54 and 58 respectively. Also at the same time the water supply in the line 21 is intermittently cut off at predetermined time intervals by means of the gear 44, pitman 45 and valve 49.

If, while the water supply is on, a greater than a predetermined pressure is developed within the pressure bypass valve mechanism, this mechanism responds to bypass water under pressure back into the pump through the intakes 15 and 16. As explained hereinabove, this water entering the pump under previously developed pressure augments the pump in its action and lessens the duty imposed upon the driving mechanism, resulting in more economical operation of the driving mechanism.

In Figure 1, I have illustrated how the fog mist is delivered to a mass of vegetable matter on the stand. This water fog, upon striking the vegetable matter, tends to roll outwardly over the edge of the stand, thereby enabling a complete treatment with water of the entire mass on the stand. The mist is so fine that even though a person be standing adjacent the stand, no water is condensed on the clothing of that person. Moreover, a person can, while the spray is being operated, pick up an article from the stand without having water condensed to a point where it is noticeable on the person's hand. Also, due to the fineness of this water mist, any of it which may be projected beyond the stand is quickly absorbed in the surrounding atmosphere, so that no condensation occurs on the floor or other surrounding objects.

The method of hydrating embodied in the present invention is deemed to be sufficiently clear from the foregoing description of the apparatus and its operation, even though this apparatus is not the only apparatus capable of performing the method, to render further description of the method herein unnecessary.

It is also to be understood that by the practice of the present method, not only is moisture in the right amount added to plant matter, but the moisture or natural water content of the plant matter is retained therein, and the plant matter does not lose its inherent and natural water content. In other instances, vegetables have actually grown while on the stand as a result of the practice of this method, while the addition of too much water, as was common heretofore, results in deterioration.

The proper care of plants, especially vegetables on display for sale, is not dependent on material variations of normal temperature, but is dependent on the proper amount of moisture, be such moisture added thereto or prevented from evaporating therefrom.

By the practice of this invention, vegetable matter, especially young vegetable matter, which is receptive to added moisture, will be properly supplied, while that which is fully grown or not receptive to added moisture for some other reason will be prevented from losing its inherent moisture. In addition, vegetable matter partly dried before being subjected to this invention may, in many cases, be restored substantially to its original state.

I am aware that many changes may be made and numerous details of the process may be varied through a wide range without departing from the principles of this invention, and I, therefore, do not purpose limiting the patent granted hereon otherwise than necessitated by the prior art.

I claim as my invention:

The process of hydrating a mass of vegetable or other plant matter disposed on a stand or the like which consists in progressively and alternately spraying from one end of the mass to the other with a fine fog-like mist of water vapor such that the plant matter may be picked up from the stand by a person without having water condensed to a point where it is noticeable on the hand of the person while the plant matter is being treated, and intermittently interrupting said spray so as to cause to be delivered to the vegetable matter amounts of water consistent with the ability of such matter to absorb the same.

BENJAMIN F. BIRD.